United States Patent
Hafner et al.

(10) Patent No.: US 9,879,583 B2
(45) Date of Patent: Jan. 30, 2018

(54) FLUID CONTAINER AND REDUCTANT SUPPLY SYSTEM WITH SUCH A FLUID CONTAINER

(75) Inventors: Carsten Hafner, Gosserweiler (DE); Alexander Schmid, Salzburg (DE)

(73) Assignee: EICHENAUER HEIZELEMENTE GMBH & CO. KG, Stuttgart (DE)

( * ) Notice: Subject to any disclaimer, the term of this patent is extended or adjusted under 35 U.S.C. 154(b) by 1062 days.

(21) Appl. No.: 13/014,612

(22) Filed: Jan. 26, 2011

(65) Prior Publication Data
US 2011/0120102 A1    May 26, 2011

Related U.S. Application Data

(63) Continuation of application No. 12/148,837, filed on Apr. 23, 2008, now abandoned.

(30) Foreign Application Priority Data

May 7, 2007    (DE) .................... 20 2007 006 636 U

(51) Int. Cl.
*H05B 3/00* (2006.01)
*F24F 1/18* (2011.01)
*F01N 3/20* (2006.01)

(52) U.S. Cl.
CPC ......... *F01N 3/2066* (2013.01); *F01N 2610/02* (2013.01); *F01N 2610/10* (2013.01); *F01N 2610/1406* (2013.01); *F01N 2610/1426* (2013.01); *Y02T 10/24* (2013.01)

(58) Field of Classification Search
CPC ............. F01N 2610/02; F01N 2610/10; F01N 2610/1406; F01N 2610/1426; F01N 3/2066; Y02T 10/24

USPC ....... 219/202, 205, 402, 406, 407, 424–427, 219/443.1, 504, 505, 542–549; 392/441, 392/458–460, 465; 123/543, 549, 550, 123/557, 558, 196 A
See application file for complete search history.

(56) References Cited

U.S. PATENT DOCUMENTS

| | | | | |
|---|---|---|---|---|
| 3,187,164 A | * | 6/1965 | Andrich | 219/504 |
| 3,375,774 A | * | 4/1968 | Fujimura et al. | 99/281 |
| 3,632,971 A | * | 1/1972 | Flanagan | 219/222 |
| 4,860,434 A | * | 8/1989 | Louison et al. | 29/611 |
| 7,257,321 B2 | * | 8/2007 | Kaastra | 392/459 |

FOREIGN PATENT DOCUMENTS

DE    10 2005 037 201    *    2/2007

OTHER PUBLICATIONS

Machine Translation of DE 10 2005 037 201 Feb. 2007.*

* cited by examiner

*Primary Examiner* — Sang Y Paik
(74) *Attorney, Agent, or Firm* — Hackler Daghighian Martino & Novak

(57) ABSTRACT

A fluid container for a motor vehicle, said container having a container wall which is made out of a plastic material and is provided with at least one metal resistance heating element. According to the invention the container wall is provided with at least one PPTC element as protection against overheating, said PPTC element being connected in series with the at least one heating element.

14 Claims, 3 Drawing Sheets

_US 9,879,583 B2_

FLUID CONTAINER AND REDUCTANT SUPPLY SYSTEM WITH SUCH A FLUID CONTAINER

The present application is a continuation of U.S. Ser. No. 12/148,837 filed Apr. 23, 2008, now abandoned.

The invention relates to a heatable fluid container for a motor vehicle with a container wall out of a plastic material with the features set forth in the preamble of claim 1. By way of example, motor vehicles are provided with such fluid containers as reservoirs for windshield washing fluids, fuel and urea solution or as filter housing for fluid filters or as conveyance modules, especially for urea solution. The invention relates also to a fluid container for a reductant supply system and a reductant supply system for a waste gas cleaning catalyst, built in as a standard feature in motor vehicles.

By way of example, such a fluid container is disclosed in DE 10 2005 037 201 A1. The therein described fluid container is a filter beaker containing filter material for the filtering of area solution. The container is made out of a plastic material. In the container bottom is embedded a heating wire that is arranged in a spiral manner. In order to protect against an overheating the heating wire is connected in series with a PTC heating element that heats an adjacent fluid reservoir, wherein it is arranged in a heating housing around which liquid flows. However, should the contents of the reservoir be cold, it is possible that the filter beaker overheats. In specific cases this may cause the plastic material of the fluid container to be locally subjected to a considerable temperature load before the heating current is reduced by the heating of the PTC heating element to such an extent the container wall can cool down.

From DE 10 2005 037 201 A1 it is also known to embed into the bottom of a fluid container of a motor vehicle a heating element out of a polymeric resistance material, especially a PTC polymer. Although by using a PTC polymer as resistance heating element it can be attained that an overheating of the container wall is precluded due to the PTC characteristics of the heating element, the high manufacturing costs are a disadvantage.

Thus, the object of the invention is to disclose a manner in which a reliable and quick responding protection against overheating can be obtained for a heatable fluid container for a motor vehicle.

SUMMARY OF THE INVENTION

In accordance with the invention, this object is attained insofar as the container wall is provided with a PPTC element as protection against overheating, which element is connected in series with the at least one heating element.

At room temperature, a PPTC element is a very low resistance polymeric PTC element. By way of example, PPTCs are sold under the trade names of PolySwitch or Multifuse.

In the case of a fluid container in accordance with the invention such as, by way of example, a reservoir, a filter housing or a conveyance module, a cost-effective metal resistance heating element is used as heating element. Only a very small amount of relatively expensive PTC polymer is required for the PPTC element that, with a heating to a critical transition temperature, typically changes its resistance by several orders of magnitude, thus drastically limiting the heating current. Thus, the PPTC element does not serve for heating but merely for a temperature limitation, similar to a safety switch, constituting a self-resetting safety device.

In the case of a fluid container in accordance with the invention, the advantages of favorable manufacturing costs of a metal resistance hearing element are combined with the quick response times of a PPTC element.

By way of example, for the embedding of the metal resistance heating element into a plastic material it can be coated by injection molding with a plastic material. Therewith can be obtained further cost savings by using a heating element that is provided with lamellar sections since these can be easier fit into an extrusion tool and have a greater heat transmission surface. Especially favorable, and thus preferred, is if, by way of example, the heating element is cut out of a sheet metal plate. Meander-shaped heating elements can be cost-effectively punched out of a metal sheet plate.

A fluid container in accordance with the invention is particularly appropriate for a urea supply system of a motor vehicle, that is to say, as urea reservoir, conveyance module or urea filter housing, because with such a use it is possible to benefit from the advantages of an ohmic heating through the container wall (without any sealing and corrosion problems, complete output up to the response of the PPTC) notwithstanding which, because of a relatively low container volume of preferably 200 ml to 300 ml, frozen container contents can be quickly thawn out. The PPTC protects not only the container wall against an overheating but it also prevents an overheating of urea solution in the container, that is thermostable only up to 85° C. Polyamides, especially polyphthalamides, are an especially appropriate material for the container wall because, on the one hand, they are urea-resistant and, on the other hand, possess the required caloric conductivity and temperature stability.

BRIEF DESCRIPTION OF THE DRAWINGS

Further details and advantages of the invention are described by means of an embodiment with reference to the accompanying drawing. The described features can be made object of individual claims or a combination thereof.

DETAILED DESCRIPTION

Figure 1:
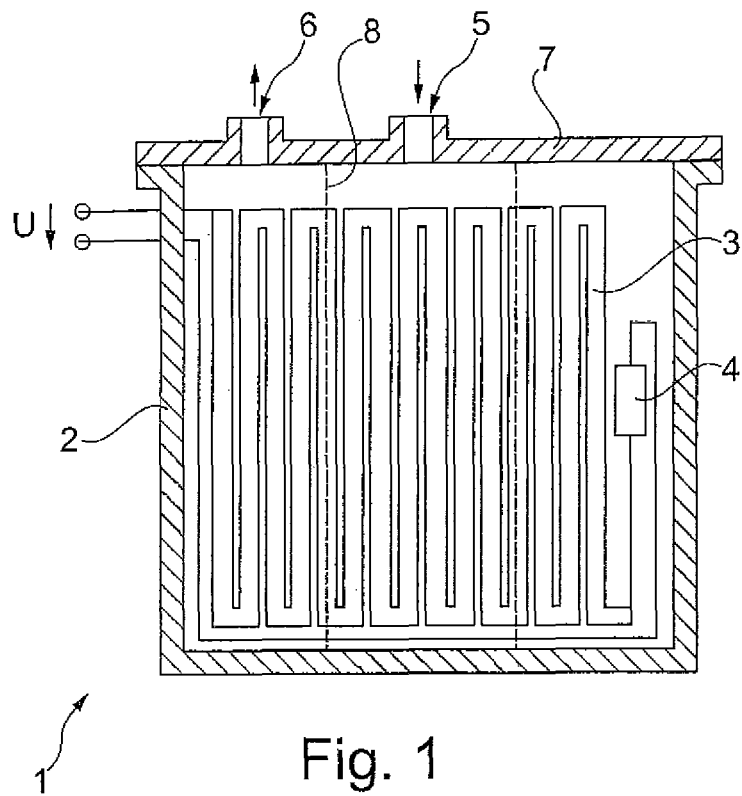
FIG. 1 shows a diagrammatic representation of an embodiment of a fluid container.

FIG. 1 shows a diagrammatic representation of a fluid container 1 for a motor vehicle. The fluid container 1 has a container wall 2 out of a plastic material and is represented in FIG. 1 by a longitudinal cut through a lateral wall. Into the container wall 2 is embedded an electric heating element 3 that surrounds the inside of the container. The heating element 3 in the represented embodiment is formed by the punching out of meander-shaped strips out of sheet metal, preferably an iron alloy, especially special steel, such as V4A steel. At room temperature, the heating formed by it has a resistance of at least 2 ohms, e.g., 2 ohms to 7 ohms, especially 4.5 to 7 ohms. A PPTC element 4 is connected in series with the heating element 3. At room temperature the PPTC element 4 has a resistance of at most 0.5 ohms, preferably not more than 0.2 ohms, especially not more then 0.1 ohms.

Figure 2:
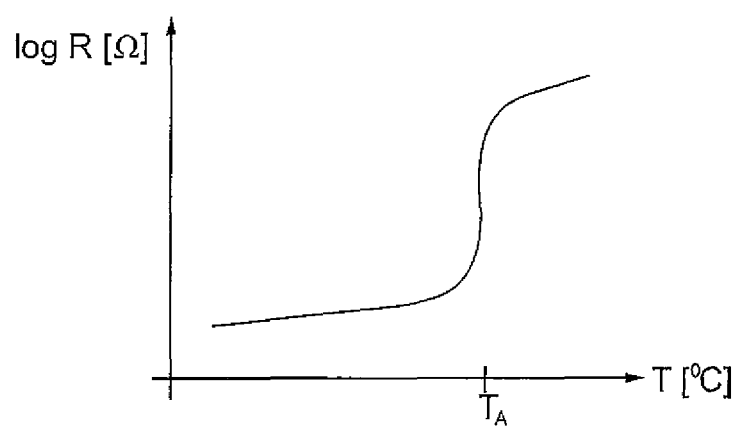
FIG. 2 shows a diagrammatic representation of the dependency of the ohmic resistance R of a PPTC element on the temperature T.

Appropriate PPTC elements are sold, e.g., under the trade names of PloySwitch or Multifuse. According to FIG. 2, the PPTC element 4 shows at a critical transition temperature an increase by several orders of magnitude of its electric resistance, protecting thus the container wall 2 against an overheating. To with, should the container wall 2 heat up to the transition temperature $T_A$ that is preferably between 85° and 125° C., the electric resistance of the PPTC element 4 increases at least by a factor of 100, especially 1000 or more, so that the heating current and, thus, the heating power dissipated by the heating element 3 drops correspondingly, therefore preventing in a reliable manner a further overheating.

In the embodiment shown, both the PPTC element 4 as well as the metal heating element 3 are embedded in the container wall 2. It is however also possible to arrange the PPTC element 4 on a surface of the container wall 2 so that, in case of need, it can be replaced. The PPTC element 4 can be arranged on the outside of the container wall but, especially, also on the inside.

It is particularly favorable if the container wall 2 is provided with several PPTC elements 4. In such a manner, a local overheating of the container wall 2 that might, for example, occur in the case of a partially filled fluid container 1, when the motor vehicle is parked at a slope, so that a portion of the lateral wall and a portion of the container bottom are covered with fluid thus being cooled, while another portion of the container wall 2 is not in contact with fluid and thus is not being cooled. It is especially favorable if in the container wall 2 are embedded several heating elements 3 connected in series which, in turn, are connected in series with several PPTC elements 4. It is especially beneficial if PPTC elements 4 are provided at several points of the container bottom. A fluid container 1 can be heated especially efficiently and quickly if, according to FIG. 1, the heating elements 3 are embedded in a container wall 2 that forms a lateral wall. Additionally, the heating element(s) 3 can also be embedded in a bottom wall.

As shown in FIG. 1, the fluid container 1 is provided with an inlet orifice 5 and an outlet orifice 6, between which is arranged a filter membrane 8. The orifices 5, 6 are arranged in a cover 7.

The fluid container 1 is particularly appropriate as a filter housing, e.g., for a filter for the filtering of urea solution. Its container volume is between 200 ml and 300 ml and the thickness of the container wall is between 3 mm and 5 mm. Polyamide, preferably polyphthalamide, is an appropriate material for the container wall.

The fluid container 1 can also be configured as a multi-chamber container. By way of example, a first chamber can constitute a fluid reservoir for the storing of fluid and forming a fluid filter with a second chamber containing a filter material, which is connected to the first chamber.

Figure 3:
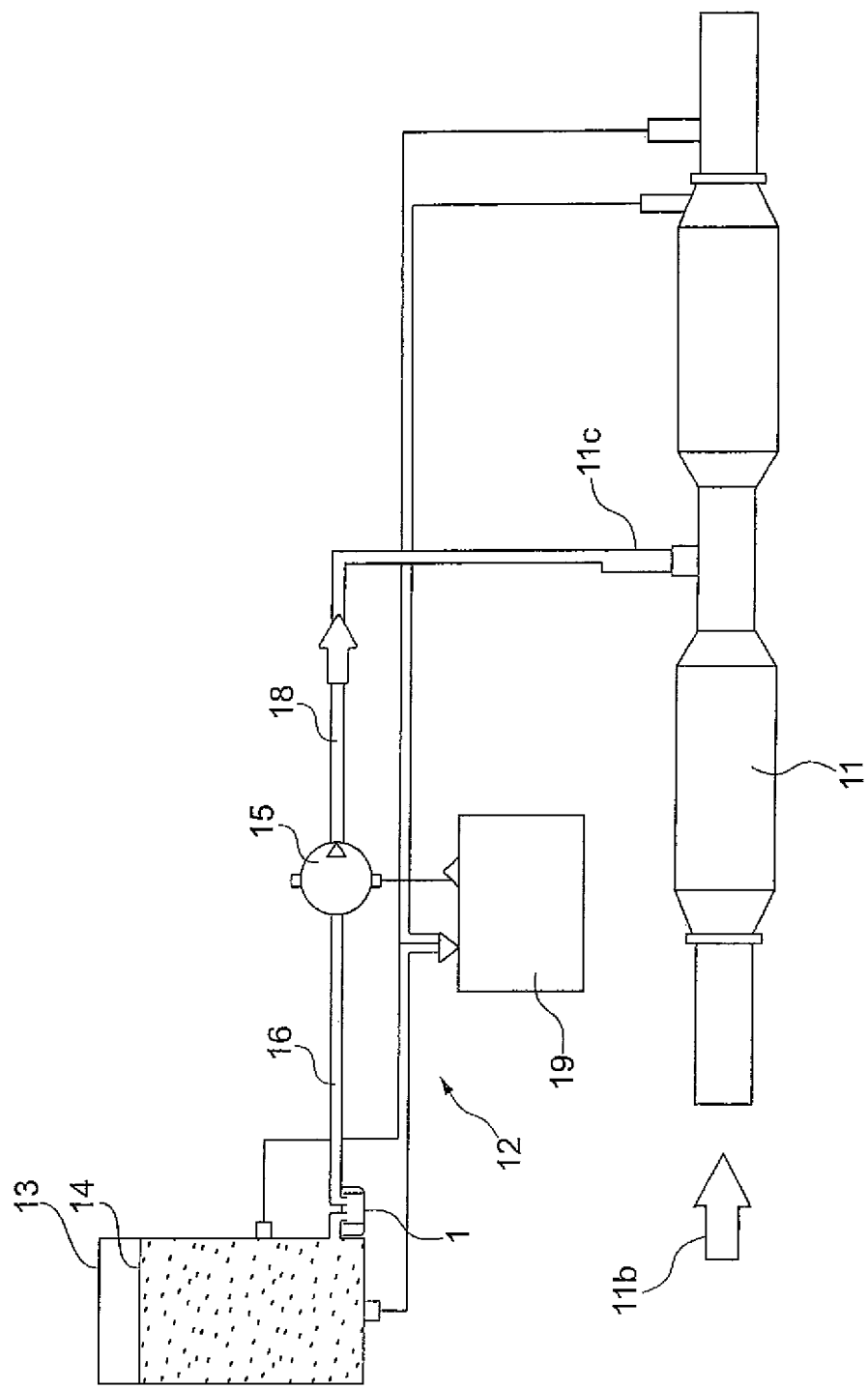
FIG. 3 shows a diagrammatic representation of an embodiment of a urea supply system for a waste gas cleaning catalyst of a motor vehicle.

The described fluid container 1 is particularly appropriate for a reductant supply system of a motor vehicle. FIG. 3 shows diagrammatically a waste gas cleaning catalyst 11 of a motor vehicle and a therewith associated reductant or, respectively, urea supply system 12. By means of ammonia as reductant, nitrogen oxides are reduced to nitrogen in the waste gas cleaning catalyst 11. The ammonia required for this is obtained from urea solution that is readied by the urea supply system 12 and is added to the waste gas flow 11b by means of the metering valve 11c.

The urea supply system 12 shown in FIG. 3 comprises an above-described fluid container as reductant reservoir 13 for the holding of urea solution 14, and electrically heatable fluid conduits 16, 18 for the conveyance of the reductant from the reductant reservoir 13 to the waste gas cleaning catalyst 1, and a pump 15 for the pumping of the reductant through the fluid conduits 16, 18 to the catalyst 11.

The pump 15 and the catalyst 11 are controlled by a control module 19 that, in the case of frost, turns on an electric heating of the reductant reservoir 1, of the pump 15 and of the fluid conduits 16, 18. The pump 15 is preferably installed abutting the reservoir 13 so that the conduit section 16 can be short enough to be sufficiently heated by a reservoir or/and pump heating system so that an inherent heating of the short conduit section 6 is unnecessary.

The represented reductant supply system is further provided with a filter 1 for the filtering of the urea solution. The housing of this filter is a fluid container 1, as shown in FIG. 1.

Figure 4:
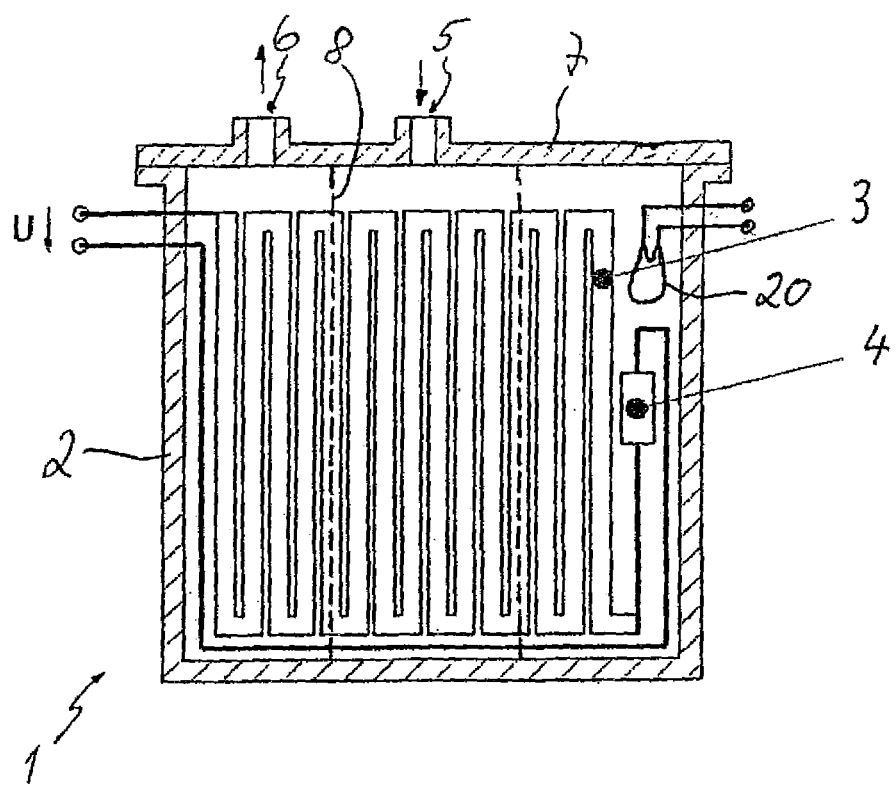
FIG. 4 shows a diagrammatic representation of another embodiment of a fluid container.

FIG. 4 shows another embodiment of a fluid container in accordance with the invention. This embodiment differs from the fluid container shown in FIG. 1 in that in the container wall 2 is additionally embedded a NTC element 20 as temperature sensor. NTC elements are also called high-temperature conductors. Typically, NTC elements are configured as semiconductor resistances with a maximized negative temperature coefficient, thus having an electric resistance decreasing as much as possible at increasing temperatures. The NTC element 20 can determine whether a heating is required and thus whether, according to need, the heating element 3 is to be connected or disconnected. The NTC element 20 is electrically independent of the heating element 3 and the PPTC element 4, i.e. electrically insulated from the heating element 3.

Just like the heating element 3, the NTC element 20 can also be embedded into the container wall 2 insofar as the latter is manufactured by injection molding and the NTC element 20 is being subject to injection molding around it. The connections of the NTC element 20 protrude from the container wall 2. To these connections can be connected a control module 19 that, according to need, connects or disconnects the heating element 3. The connections of the NTC element 20 can be arranged in the proximity of the connections of the heating element 3, especially in a common plug together with the connections of the heating element 3 in order to facilitate the connecting of the container.

REFERENCE NUMBERS LIST

1 Fluid container
2 Container wall
3 Heating element
4 PPTC element
5 Inlet orifice
6 Outlet orifice
7 Cover
8 Filter membrane
11 Waste gas cleaning catalyst
11b Waste gas flow
11c Metering valve
12 Reductant supply system
13 Reductant reservoir
14 Urea solution
15 Pump
16 Fluid conduit
18 Fluid conduit 19 Control module
20 NTC element

What is claimed is:

1. A fluid container for a motor vehicle, comprising:
a plastic container having a plastic container wall;
at least one metal resistance heating element embedded into the plastic container wall; and
at least one self-resetting safety device, said self-resetting safety device being a PPTC element disposed outside of the plastic container for protection against overheating, said at least one PPTC element being connected in series with the at least one heating element, the electric resistance of the heating elements being at least 30 times the electric resistance of the PPTC element below a critical transition temperature thereof and wherein the PPTC element is configured to be heated to the critical transition temperature and change its resistance by at least three orders of magnitude drastically limiting the heating current.

2. A fluid container according to claim 1, wherein the heating element is provided with lamellar sections.

3. A fluid container according to claim 1, wherein the container wall, provided with the at least one heating element, forms a lateral wall.

4. A fluid container according to claim 1, wherein the container wall, provided with the at least one heating element, forms a bottom wall.

5. A fluid container according to claim 1, wherein the container wall is provided with several PPTC elements.

6. A fluid container according to claim 5, wherein several heating elements are embedded in the container wall and connected in series with the PPTC elements.

7. A fluid container according to claim 1, further comprising a first chamber, forming a fluid reservoir for the holding of fluid, and a second chamber, connected with the first chamber, for containing a filter material.

8. A fluid container according to claim 1, wherein the electric resistance of the PPTC element at room temperature is at most 0.5 ohm.

9. A fluid container according to claim 1, wherein at room temperature the heating element has a total resistance of at least 2 ohms.

10. A fluid container according to claim 1, wherein the container wall has a thickness of 3 mm to 5 mm.

11. A fluid container according to claim 1, wherein the container wall is made out of a polyamide.

12. A fluid container according to claim 1, wherein a temperature sensor is embedded in the container wall.

13. A fluid container according to claim 12, wherein the temperature sensor is a NTC element.

14. A fluid container according to claim 1 having a container volume of 200 ml to 300 ml.

* * * * *